June 1, 1937.  C. F. VAN BLANKENSTEYN  2,082,311
FASTENER FOR LICENSE PLATES
Filed July 9, 1935
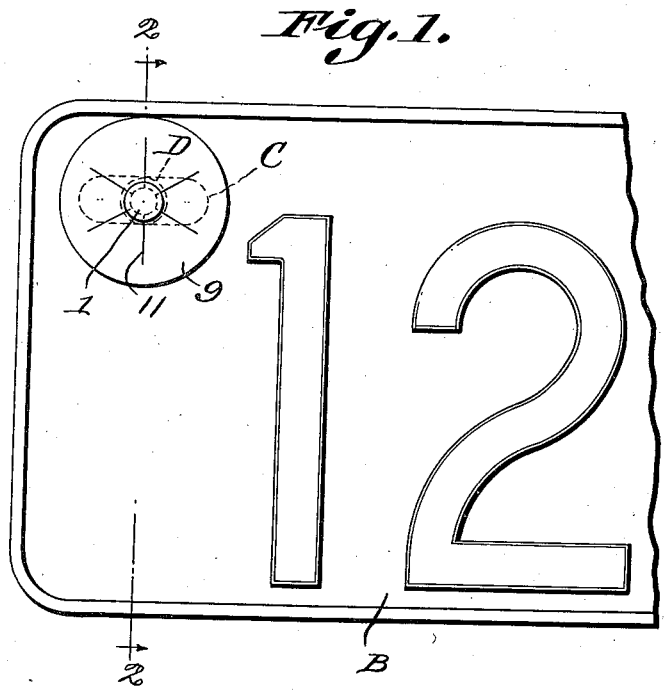
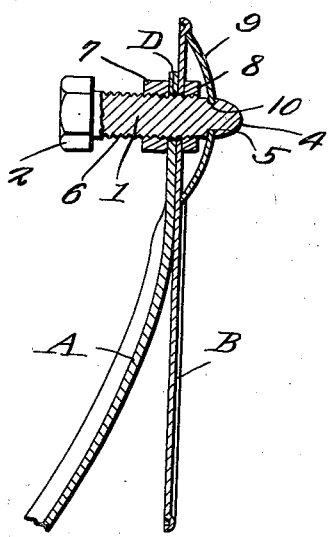
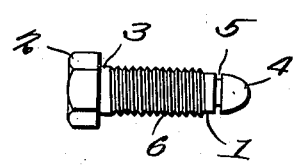
Inventor
C. F. Van Blankensteyn
By C. A. Snow & Co.
Attorneys Patented June 1, 1937

2,082,311

UNITED STATES PATENT OFFICE 2,082,311

FASTENER FOR LICENSE PLATES

Cornelius Francis Van Blankensteyn, Lansing, Mich.

Application July 9, 1935, Serial No. 30,557

1 Claim. (Cl. 40—125)

This invention relates to a fastener for license plates and is more especially an improvement upon the structure disclosed in Patent 1,938,878 issued to me on December 12, 1933.

Heretofore difficulty has been experienced in maintaining a tight connection between the license plate and its support where a brittle cap has been used for identification purposes. Consequently the cap thus used has at times been broken accidentally.

It is an object of the present invention to provide a means whereby the license plate can be clamped rigidly to its support, so that no strain will be placed upon the seal or detector cap unless a definite attempt is made to remove said cap or seal from the fastener.

A still further object is to provide a sealing cap which constitutes a housing for a portion of the fastening means.

Another object is to provide a fastening means which can be adjusted when necessary to tighten the license plate should the parts work loose from any cause, this tightening operation being effected without danger of breaking the sealing cap.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a front elevation of a portion of a license plate held in place by the fastener constituting the present invention.

Figure 2 is a section on line 2—2 Figure 1.

Figure 3 is a side elevation of the bolt of the fastener.

Referring to the figures by characters of reference, A designates a bracket such as commonly used for supporting a license plate B and this plate has a slot C adapted to register with an opening D in the bracket so that a bolt I can be inserted into the two openings. As shown in Figure 3 this bolt has a head 2 from which extends a shank 3. That end of the shank remote from the head is rounded or tapered as shown at 4 and is provided with an annular groove 5. Between the head 2 and the groove 5 the shank is screw threaded as shown at 6 and this threaded portion is adapted to receive a nut 7 which will be supported adjacent to the head prior to the insertion of the bolt through the openings. Subsequent to the insertion of the bolt a second nut 8 is placed over the unthreaded and grooved portion of the bolt and brought into engagement with one end of the threaded portion of the shank.

Following this application of the bolt to the parts a concavo-convex cap 9 formed of a brittle material is applied to the bolt for use as a seal. This cap has a central opening 10 the diameter of which is slightly less than the diameter of the unthreaded portion of the bolt and slits 11 extend from the central opening to points adjacent to the periphery of the cap so as thus to divide the central portion of the cap into segments as shown in Figure 1.

To apply the cap the open central portion is forced onto the tapered end of the bolt, thus causing the segments to flex sufficiently to slide along the bolt until they reach the groove 5 at which time they will snap into the groove. This will bring the margin of the cap into contact with the license plate and obviously the cap will completely house nut 8. Following the application of the cap the nut 7 is tightened against the bracket A so that the bracket and the license plate will thus be clamped tightly between the two nuts and the plate held securely against movement relative to the bracket.

Obviously after the license plate has been fastened in the manner described it becomes impossible to remove it from the bracket without first removing the cap 9 and as this cap is concavo-convex and formed of a brittle material, any attempt to remove it from the bolt will result in breaking the cap. The cap can be specially marked for identification purposes and thus serves as an efficient means for detecting removal and substitution of a license plate.

Importance is attached to the fact that the sealing cap is subjected to no strain unless an attempt is made to remove it. This is due to the fact that the clamping action is effected solely by the bolt and the two nuts. Furthermore as one of the nuts is housed in the cap, unauthorized tampering with the fastener is further hindered.

What is claimed is:

The combination with a license plate and a support therefor, of a fastener comprising a threaded bolt extending through the support and plate and having a tapered end and a head at its other end, there being an annular groove adjacent to its tapered end, nuts adjustably mounted on the bolt between the groove and head and with the plate and support therebetween, said nuts binding together the plate and support, and a frangible concavo-convex sealing cap seated at its center in the groove and bearing at its margin upon the license plate, said plate and cap cooperating to house one of the nuts, said cap being provided with radial slits extending from the bolt receiving opening and defining an annular series of segmental portions.

CORNELIUS FRANCIS VAN BLANKENSTEYN.